United States Patent
Sharma et al.

(10) Patent No.: US 11,570,296 B2
(45) Date of Patent: Jan. 31, 2023

(54) END-TO-END MANAGEMENT OF AUTHENTICATED COMMUNICATIONS

(71) Applicant: Neustar, Inc., Sterling, VA (US)

(72) Inventors: Gaurav Sharma, Sterling, VA (US); Guido Jonjie S. Sena, Jr., Sterling, VA (US); Ken Politz, Sterling, VA (US); Marybeth Degeorgis, Sterling, VA (US); Manjul Maharishi, Sterling, VA (US); Jason Torrey, Sterling, VA (US); James Garvert, Sterling, VA (US)

(73) Assignee: Neustar, Inc., Reston, VA (US)

( * ) Notice: Subject to any disclaimer, the term of this patent is extended or adjusted under 35 U.S.C. 154(b) by 0 days.

(21) Appl. No.: 17/247,387

(22) Filed: Dec. 9, 2020

(65) Prior Publication Data

US 2022/0182487 A1  Jun. 9, 2022

(51) Int. Cl.
*H04M 3/42* (2006.01)
*H04M 3/38* (2006.01)

(52) U.S. Cl.
CPC ....... *H04M 3/42042* (2013.01); *H04M 3/382* (2013.01)

(58) Field of Classification Search
None
See application file for complete search history.

(56) References Cited

U.S. PATENT DOCUMENTS

| | | | | |
|---|---|---|---|---|
| 8,290,130 B2 * | 10/2012 | Cheon | ............... | H04M 3/42042 379/142.05 |
| 9,060,057 B1 | 6/2015 | Danis | | |
| 9,781,255 B1 * | 10/2017 | Gailloux | ............... | H04L 63/126 |
| 9,948,759 B1 * | 4/2018 | Haltom | ................. | H04M 3/527 |
| 10,681,206 B1 * | 6/2020 | Kreiner | ............. | H04M 3/42059 |
| 10,771,624 B1 | 9/2020 | Penar et al. | | |
| 10,992,799 B2 * | 4/2021 | Harrison | ........... | H04M 3/42042 |

(Continued)

FOREIGN PATENT DOCUMENTS

NL    1040311 C2    1/2015

OTHER PUBLICATIONS

Rescorla et al., "STIR Out-of-Band Architecture and Use Cases," Network Working Group, Internet-Draft, Mar. 9, 2020; pp. 1-28.

(Continued)

*Primary Examiner* — Quoc D Tran
(74) *Attorney, Agent, or Firm* — Sterne, Kessler, Goldstein & Fox, P.L.L.C.

(57) ABSTRACT

Disclosed herein are systems and methods for providing mobile call authentication. For instance, a token indicative of a call request can be received from a calling party. The token can include a called party number and a time of the request. A subscriber database can be accessed to determine identifying information associated with the calling party based at least in part on the token. The token can be authenticated based at least in part on the identifying information and using one or more predefined authentication protocols. The token can be stored in a call session registry storing data indicative of a plurality of active telephone call events. A verification request for the call request can be received from the called party. The call request can be verified based at least in part on the token. The called party can be notified that the call request has been verified.

19 Claims, 8 Drawing Sheets

(56) References Cited

U.S. PATENT DOCUMENTS

| | | | |
|---|---|---|---|
| 11,102,345 B2* | 8/2021 | Mohali | H04M 3/436 |
| 2004/0208302 A1* | 10/2004 | Urban | H04M 15/00 |
| | | | 379/142.17 |
| 2008/0181379 A1* | 7/2008 | Chow | H04L 63/1441 |
| | | | 379/142.05 |
| 2021/0360402 A1* | 11/2021 | Powers | H04W 76/10 |

OTHER PUBLICATIONS

Extended European Search Report and Annex to the Extended European Search Report dated Apr. 25, 2022 for European Appl. No. EP 21213516.4, 9 pages.

"Unwanted Robocalls Challenges and Solutions", GSM Association, GSMA Floor 2 The Walbrook Building 25 Wallbrook London, UK, Feb. 6, 2020 (Feb. 6, 2020), 17 pages.

\* cited by examiner

END-TO-END MANAGEMENT OF AUTHENTICATED COMMUNICATIONS

FIELD

The present disclosure relates generally to call authentication, and more specifically to authenticated communication management.

BACKGROUND

Caller ID spoofing and robocalling are among the leading consumer complaints in the telephony space. These practices negatively impact the consumer experience, and thus are disliked by enterprises and individuals alike. These practices result in an unwillingness by consumers to answer incoming call requests, and are thus affecting the ability of enterprises or organizations to interact with their customers over the phone. Regulators and legislators have begun to implement call authentication techniques, such as STIR/SHAKEN (S/S), to address this problem. S/S allows telephone service providers to use digital certificates, based on common public key cryptography techniques, to ensure the calling number of a telephone call is secure.

But S/S, and other similar authentication techniques, have limitations or drawbacks. For instance, S/S does not allow for enterprises or other calling parties to sign or authenticate outgoing calls themselves, relying on the telephone service providers to perform the authentication. Further, S/S requires end-to-end IP infrastructure for authenticating calls, whereas conventional call paths between calling and called parties may use non-IP infrastructure types at least in part. Thus, solutions for more effective call authentication are needed.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for providing end-to-end mobile call authentication. The method includes receiving a token indicative of a call request from a calling party. The token includes a called party telephone number and a time of the call request. The method further includes accessing a subscriber database to determine identifying information associated with the calling party based at least in part on the token. The method further includes authenticating the token based at least in part on the identifying information and using one or more predefined authentication protocols. The method further includes storing the token in a call session registry. The call session registry stores data indicative of a plurality of active telephone call events. The method further includes receiving a verification request for the call request from the called party. The method further includes verifying the call request based at least in part on the token. The method further includes, in response to the verifying, notifying the called party that the call request has been verified.

Other aspects of the present disclosure are directed to systems, apparatus, tangible, non-transitory computer-readable media, user interfaces and devices for providing end-to-end mobile call authentication.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

This Summary is provided merely for purposes of reviewing some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Detailed discussion of embodiments directed to one of ordinary skill in the art is set forth in the specification, which makes reference to the appended figures, in which.

DETAILED DESCRIPTION OF THE INVENTION

Figure 1:
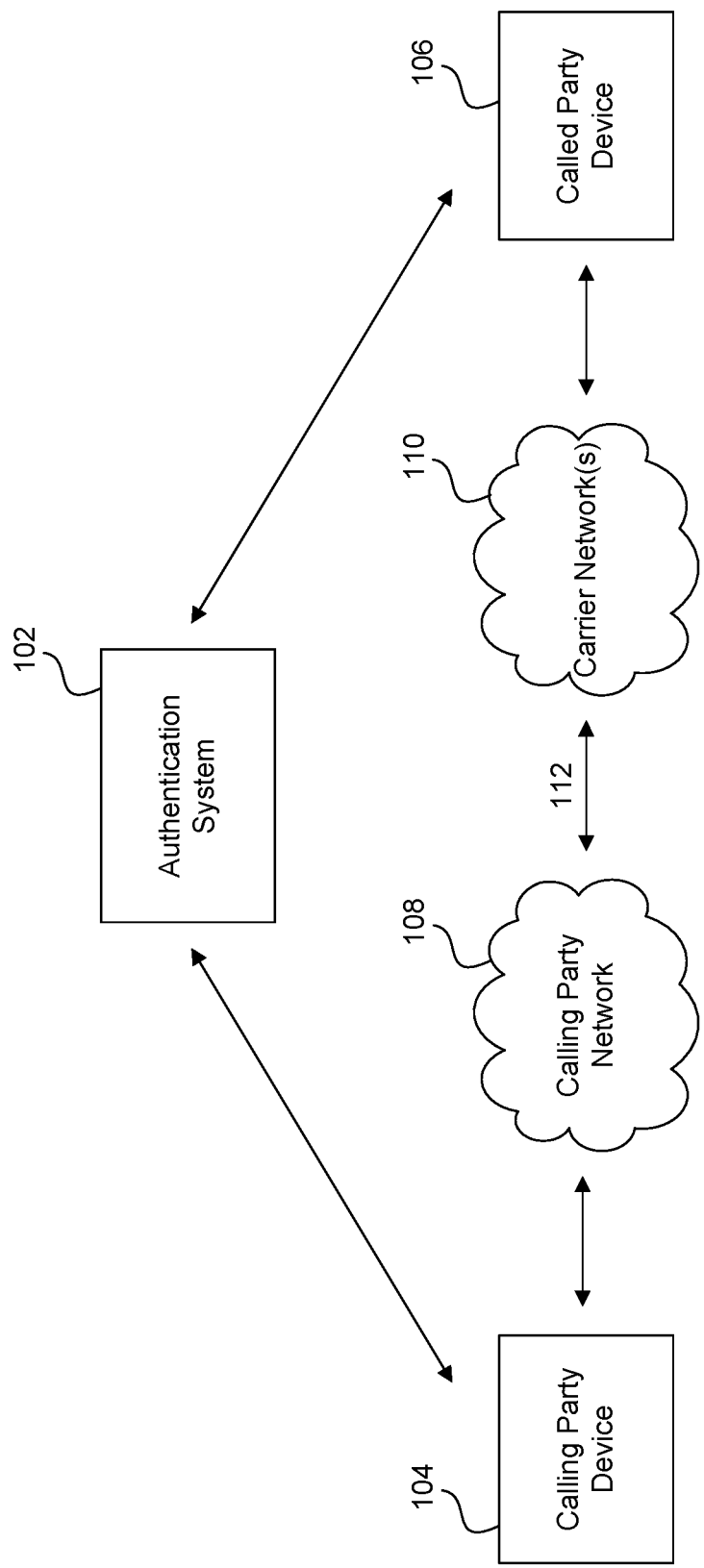
FIG. 1 depicts an example system according to example embodiments of the present disclosure.

Reference will now be made in detail to embodiments, one or more examples of which are illustrated in the drawings. Each example is provided by way of explanation of the embodiments, not limitation of the invention. In fact, it will be apparent to those skilled in the art that various modification and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Example aspects of the present disclosure are directed to providing end-to-end mobile call authentication. For instance, a calling party, such as an enterprise or organization, can place a call request to a called party, such as a mobile telephone. The calling party can also send a token indicative of the call request to a third-party authentication system, which can store the token in a call session registry configured to log and record active telephone calls and call requests. The authentication system can further access a subscriber database to authenticate the token using one or more predefined authentication protocols. The authentication system can then receive a verification request for the call request from the calling party. The authentication system can then perform a verification process for the call request by determining whether the call session registry includes an active token corresponding to the call request. If so, the authentication system can inform the calling party that the call request has been verified.

The call request can traverse a call path from the calling party to the called party. As defined herein, the call path includes the path between the called party and the calling party on which telephone call data travels to affect voice communication between the calling party and the called party. The call path can includes one or more telephony networks, such as a network associated with the calling party and one or more carrier networks. For instance, the one or more telephony networks can include one or more private branch exchanges (PBX), voice over internet protocol (VOIP) systems, cellular networks (e.g., a fifth generation (5G) network, a long-term evolution (LTE) network, a third generation (3G) network, a code division multiple access (CDMA) network, etc.), public land mobile networks (PLMN), local area networks (LAN), wide area networks (WAN), public switched telephone networks (PSTN)), private networks, ad hoc networks, intranets, the Internet, fiber optic-based networks, and/or the like, and/or a combination of these or other types of networks. In some instances, the call request can be authenticated by one or more telephone service provider entities on the call path, for instance using the Stir/Shaken (S/S) protocol.

As explained, according to example aspects of the present disclosure, upon placing the call request, the calling party can further provide a token indicative of the call request to a third party authentication system that is not on the call path via a network such as the Internet. That is, the third party authentication system can be a system that is not associated with the telephone service provider(s) of the call path. The token can include a telephone number for the calling party, a telephone number for the called party, a date and time of the call request, a direction of the call request (e.g. from the called party to the calling party), information associated with the calling device (e.g., type allocation code (TAC), model, capabilities, etc.), subscription information for the authentication system (e.g., prepaid etc.), carrier network information (e.g., facilities, path, etc.), and/or other suitable information associated with the call request. The token can be generated, for instance, by an application associated with the third party authentication system and/or the calling party (e.g., enterprise, organization, etc.) and installed on the calling party device or on one or more other computing devices associated with the calling party network. In some implementations, the calling party can send the data to be implemented in the token to the authentication system and the authentication system can generate the actual token. In some implementations, the calling party can generate a first portion of the token and the authentication can generate a second portion of the token after receiving the token.

The authentication system can further authenticate the received token using one or more predefined authentication protocols (e.g., S/S, federated identity, or other protocols). For instance, the authentication can include determining that the token is a valid token, and that the calling party and/or the called party are authorized to use the authentication system. In this manner, the authentication system can access a subscriber database to determine information associated with the called and/or calling party. As will be described in greater detail below, the authentication system can register subscribers and store information associated with the subscribers in the subscriber database. This information can include user profile information, a unique client identification, application information, device information (capabilities, model, etc.) subscription information (e.g., services and/or entities subscribed to), policy specifications (e.g., actions to be taken upon placing or receiving call request from different parties), etc. In some implementations, the subscriber database can further include information regarding prior communications of a telephone device, such as an impression status (presented/not-presented), call duration, call start time, call end time, called party in native call directory, call network (gsm, cdma, ims, 5G), cell location, etc. In this manner, upon registration, subscribers can specify the services to which they would like to subscribe, and can specify how they would like to interact with calling or called parties.

Upon authenticating the token, the authentication system can store the token in a call session registry that keeps a record of all active telephone calls and call requests known by the system. For instance, the call session registry can log and store each call request and call received by the system, and can store the tokens corresponding to the active calls and call requests until their termination. Upon termination of call request or initiated call resulting from the call request, the authentication system can delete or remove the token and/or any other information associated with the terminated call from the call session registry.

Subsequent to receiving the token for a call request, the authentication system may receive a verification request from the called party to which the call request is placed. That is, data indicative of the call request can traverse the call path independently from the authentication system in a manner known in the art. Upon receiving the data indicative of the call request, the called party can request the authentication system to verify the received call request by sending data indicative of the call request to the authentication system. Such data can include a calling party telephone number, called party telephone number, timestamp of the call request, etc. In some implementations, the data indicative of the call request can include information implemented in a session initiation protocol (SIP) INVITE message including a SIP identity header in accordance with a S/S protocol carried out by the telephone service providers of the call path.

The authentication system can then perform a verification process on the call request by determining whether the call session registry is storing a token corresponding to the data indicative of the call request (e.g., having attributes that match the data indicative of the call request). If the call session registry is storing such a token, the authentication system verifies the call request. If the call session registry is not storing such a token, the authentication system does not verify the call request. In some implementations, the verification process can include determining a reputation of the calling party based on previous interactions with the called party and/or other called parties. For instance, the authentication system may not verify a call request if the reputation of the calling party is below a threshold score. The authentication system can inform the calling party of the verification result. In some implementations, the authentication system can further provide content, such as images, multimedia, and/or rich media content to the called party device. The called party device can then output the image(s) and/or rich media content.

For instance, the authentication system can provide images associated with the calling party to the called party device. These images can be stored in the subscriber database. In this manner, the called party can specify the images to be provided to a calling party upon a call request to the calling party. In some implementations, the authentication system can select the images based at least in part on the called party device specifications. For instance, the authentication system can access the subscriber database to determine the called party device screen size, resolution, processing capabilities, etc., and can select an image based on these specifications. In some implementations, the authentication systems can dynamically create or modify an image to be provided to the called party device based at least in part on these specifications.

Referring now to the drawings, FIG. 1 depicts an example system 100 according to example aspects of the present disclosure. System 100 includes an authentication system 102, a calling party device 104 and a called party device 106. The calling party device 104 and the called party device 106 can communicate via calling party network 108 and carrier network(s) 110. Calling party device 104 and called party device 106 can be any type of device used to place or receive a telephone call, including, for example, an analog telephone, a digital telephone, a wireless telephone, a computer telephony device, a Voice over Internet Protocol (VOIP) based telephone, etc.

Calls communicated between the calling party device 104 and the called party device 106 can be routed along the call path 112 that includes the calling party network 108 and the carrier network(s) 110. In the implementation shown in FIG. 1, calling party device 104 can be a device used by an entity, such as a business, enterprise, individual user, or other entity, that implements calling party network 108 for placing and receiving calls within the enterprise. Calling party network 108 can be a network implemented within the enterprise, such as a private branch exchange (PBX) supporting multiple lines or key system supporting multiple lines, VOIP system, etc. It will be appreciated that in some implementations, the called party device 106 may be an enterprise, and may implement its own internal network similar to the calling party network 108. In some implementations, neither party uses an internal network. Carrier network(s) 110 can include, for example, wire line or wireless networks, cellular networks, traditional plain old telephone service (POTS) networks, IP-based networks, public land mobile networks (PLMN), local area networks (LAN), wide area networks (WAN), public switched telephone networks (PSTN)), private networks, ad hoc networks, intranets, the Internet, fiber optic-based networks, and/or the like, and/or a combination of these or other types of networks. It will be appreciated that calls between the calling party device 104 and the called party device 106 can be further routed through suitable infrastructure, such as one or more analog switches (e.g., 1AESS), digital switches (e.g., 5ESS), IP network switches, and/or IP network routers.

In some embodiments, the carrier network(s) 110 can authenticate calls communicated between the calling party device 104 and the called party device 106, such as by using the S/S protocol. As will be appreciated by those skilled in the arts, in such embodiments, when placing a call, the calling party device 104 and/or the calling party network 108 can provide a SIP INVITE message to the carrier network 110 associated with the calling party device 104, which determines an attestation level of the calling party device 104. The carrier network 110 associated with the calling party device 104 then implements the attestation level (along with the calling party number, the called party number, and a timestamp of the call request) in a SIP Identity header, and provides the SIP INVITE and Identity header to the carrier network 110 associated with the called party device 106. The carrier network 110 associated with the called party device can then verify the calling party device 104.

According to example embodiments of the present disclosure, the authentication system 102 can perform authentication of the calling party device 104 in addition or alternatively to the authentication performed in the call path 112. As will be described in greater detail below, users can register with the authentication system 102 to create a trusted channel between the authentication system and the telephone devices associated with the registered users. Once users are registered, the authentication system 102 can authenticate and verify call requests placed and received by the users. The authentication system 102 provides a more robust authentication than that provided by S/S, and further allows for a more tailored experience for each individual user.

Figure 2:
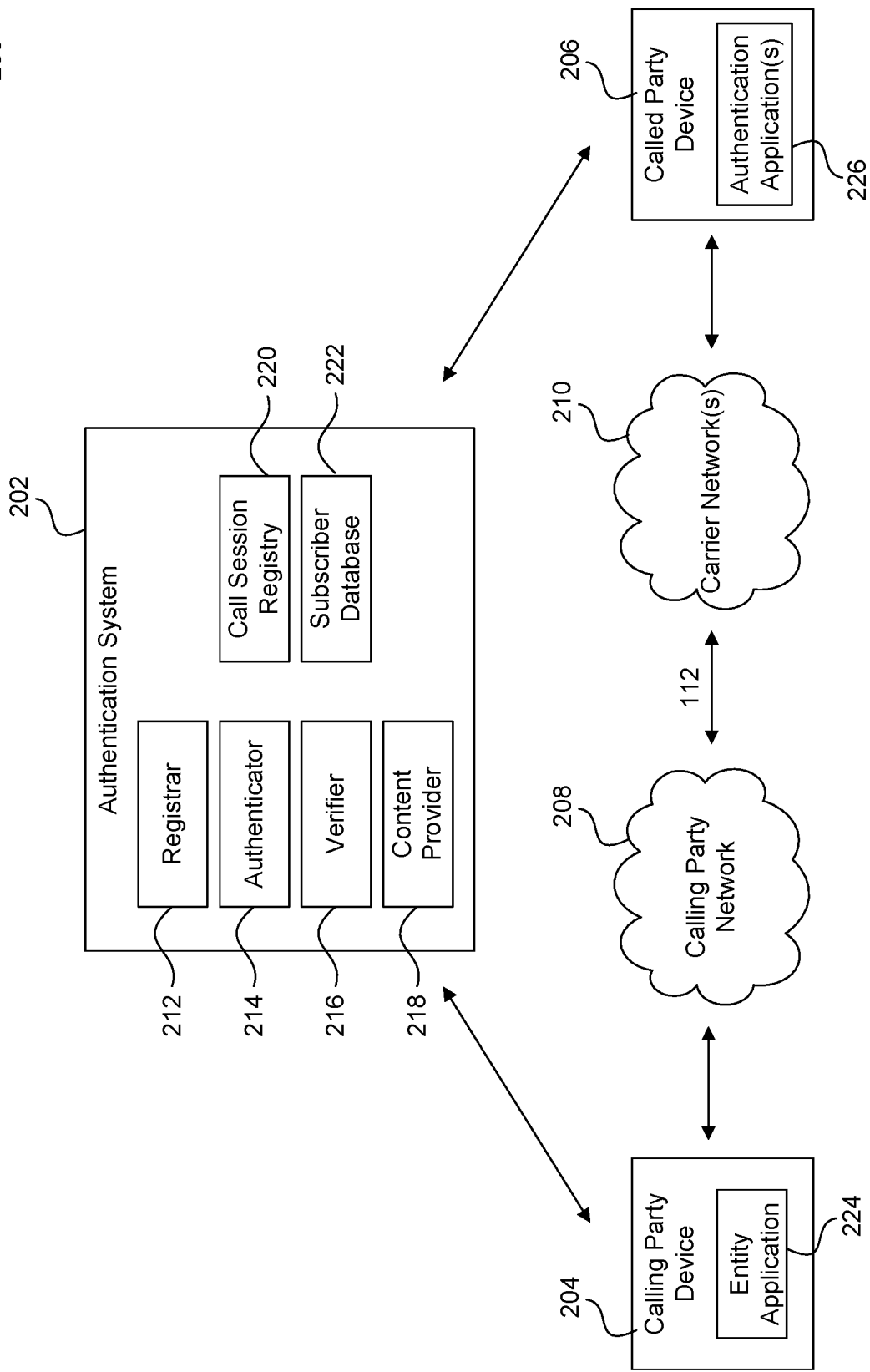
FIG. 2 depicts an example system according to example embodiments of the present disclosure.

FIG. 2 depicts an example system 200 according to example embodiments of the present disclosure. System 200 can correspond to system 100 of FIG. 1, or other suitable system. Similar to system 100, system 200 includes an authentication system 202, calling party device 204, and called party device 206. Calling party device 204 and called party device 206 communicate via calling party network 208 and carrier network(s) 210. Authentication system 202 includes a registrar 212, and authenticator 214, a verifier 216, and a content provider 218. Authentication system 202 further includes a call session registry 220 and a subscriber database 222. Calling party device 204 implements an entity application 224 and called party device 206 implements an authentication application 226. Generally speaking, the entity application 224 and the authentication application 226 allow the calling party device 204 and called party device 206 to respectively communicate with the authentication system 202.

Registrar 212 can be configured to register users to create a trusted channel between the authentication system 202 and the registered users. For instance, for entities (e.g., enterprises, organizations, businesses, individual users, etc.) to authenticate and/or verify calls using the authentication system 202, they must first register with the authentication system 202. In this manner, the entities send subscriber data to the authentication system 202 to register with the system. For instance, an entity can provide subscriber data to the registrar 212 via one or more networks (not in the call path) such as the Internet. In some implementations, the telephone devices (e.g., calling party device 204 and called party device 206) associated with the entities can send the subscriber data. In some implementations, one or more other computing devices associated with the entities can send the subscriber data. The subscriber data can include identifying information, such as a unique identification, user profile, an identity of the enterprise or organization with which the calling party device is associated, carrier information, customer data (e.g., customer telephone numbers, identifying information, etc.), etc. The subscriber data can further include device information associated with an entity's telephone devices. For instance, the device information can specify the telephone number(s) associated with an entity's telephone device(s). In the case of an entity with multiple telephone devices, the device information can include a plurality of telephone numbers associated with telephone devices of the entity. The device information can further include capabilities and specifications of the entity's telephone device(s). For instance, the device information can include a make and model, processing capabilities, graphics capabilities, memory resources, display size and resolution, communication capabilities (e.g., voice, video, sms) etc. of the users' telephone devices. In some implementations, the subscriber database can further include information regarding prior communications of a telephone device, such as an impression status (presented/not-presented), call duration, call start time, call end time, called party in native call directory, call network (gsm, cdma, ims, 5G), cell location, etc.

The subscriber data can further include policy or subscription information of the entity. For instance, the subscriber or policy data can include services and/or entities (e.g., businesses, enterprises) to which the entity subscribes. For instance, the subscriber or policy data can include one or more entities also registered with the authentication system of which a user is a customer or client (or has some other association with). The subscriber or policy data can further include actions to be taken upon placement of a call request, and/or actions to be taken upon receipt of different types of telephone call requests (e.g., verified requests, spoofed calls, robocalls, etc.). In this manner, users can specify content (e.g., images, multimedia content, rich content, etc.) to be provided to a called party upon placement of a call request to the called party. Similarly, users can specify how the authentication system 202 should handle received calls (e.g., automatically block spoofed calls or robocalls, inform the user that the call is a spoofed call or robocall without blocking, automatically sending a call to voicemail, automatically submitting a complaint to a third-party entity such as a robocall master list, issue a challenge regarding the call, etc.). In some implementations, the policy data for a user can include different actions for different parties. The policy data can be specified based on a relationship or interaction history between the parties. For instance, the policy data can specify first content to be provided to a first called party and second content to be provided to a second called party. As another example, the policy data can specify content based on a relationship between uses (e.g., customers vs., non-customers). As another example, the policy data can specify a first action to be performed upon receipt of a call request from a first calling party, and a second action to perform upon receipt of a call request from a second calling party.

In some implementations, the subscriber database 222 can include other data, not directly provided by the user. For instance, the authentication system can determine a reputation of a user based on the user's history and feedback. The reputation can be determined based on whether the calling party has been successfully authenticated in the past, how long ago the authentication or authentication was performed, whether the calling party has been flagged for call spoofing or robocalling, or other suitable parameter. The reputation can further be determined based on a frequency of calls (e.g., a number of calls within a threshold timeframe that originate from calling party device), a velocity of calls (e.g., how frequently calls are allegedly originating from calling party device), a line type (e.g., a landline, an IP phone, a cellular phone, etc.), etc. In some implementations, the reputation of a user can be different with respect to different called parties. That is, a user may have a first reputation score with respect to a first called party to which the user places calls, and a second reputation score with respect to a second called party to which the user places calls. This can be determined based at least in part on an interaction history between the specific parties.

The subscriber database 222 can further include data indicative of the interaction history between parties. Such data can include data specifying a frequency of calls between the parties, data specifying a velocity of calls between the parties, data specifying how often call requests between the parties have been verified, data specifying how often the called party accepts (answers) call requests from the calling party, data specifying types of content provided from the calling party to the called party, etc.

Once users are registered, the registrar 212 can store the users' subscriber data in the subscriber database 222. This subscriber data can be used to authenticate and verify call requests, and to provide services such as tailored content delivery to the registered users. The subscriber data provides a trusted channel between the registered users and the authentication system 202 by enabling the authentication system 202 to identify calling and called parties. In some implementations, the subscriber data can be updated periodically to reflect user changes. For instance, if the user purchases a new telephone, the registrar 212 can update the telephone number, device capabilities and specifications to reflect those of the new telephone. Similarly, if the user wishes to update or change his subscription, the registrar can update the subscriber data accordingly. As another example, an entity that adds or subtracts telephone devices can provide updated telephone device information (e.g. telephone numbers) associated with the entity. As yet another example, if the user wishes to update or change his policy information (e.g., change the content provided to called parties, change how the authentication system handles spoofed calls, etc.), the registrar can update the user's subscriber data to reflect these changes.

In some implementations, the authentication system 202 can provide at least a portion of the subscriber data store in the subscriber database 222 to telephone devices registered with the authentication system 202. For instance, the authentication system 202 can provide subscriber data associated with an entity to the telephone devices of customers of the entity that are also registered with the authentication system. Such data can include the list of telephone numbers of the entity, or other information associated with the entity. In this manner, the telephone device can determine that a call request comes from the entity by accessing the list of telephone numbers associated with the entity.

As explained, registered users can use the authentication system 202 to authenticate and/or verify call requests. In this regard, when a calling party device, such as calling party device 204, places a call request via the call path, the calling party device can provide a token indicative of the call request to the authentication system 202. For instance, the entity application 224 implemented in the calling party device 204 and/or calling party network can determine that the call request has been placed, and can generate a token descriptive of the call request. The token can include, for instance, a calling party number, a called party number, a timestamp of the request, a unique identifier for the calling party device, a unique identifier of the called party device, an identification of the application 224, and/or other suitable information. The application 224 can send this token to the authentication system 202 independent from, for instance, a SIP INVITE message sent to the carrier network(s) 210.

Once the token is received at the authentication system 202, the authenticator 214 performs an authentication process on the token using one or more suitable authentication protocols (e.g., S/S, federated identity, etc.). For instance, the authentication process can include determining whether the calling party device and/or the called party device is registered with the authentication system. In this manner, the authenticator 214 can compare the data included in the token to data stored in the subscriber database 222. That is, the authenticator 214 can access the subscriber database 222 to determine whether the data included in the token (e.g., phone numbers, unique identifiers, device identifiers, etc.) corresponds to subscriber data associated with the calling party device and/or called party device. If the token corresponds to a subscriber, the authenticator 214 will authenticate the token and store it in the call session registry 220. If the token does not correspond to a subscriber, the authenticator 214 may not authenticate the token and may discard the token. In some implementations, the authenticator 214 may record the discarded token data for future use in identifying spoofed calls.

As explained above, the call session registry 220 can keep a record of all active telephone calls and call requests known by the authentication system 202. For instance, the call session registry 220 can log and store tokens associated with each call request and call received by the authentication system 202, and can store the tokens until the call and/or call request's termination. Upon termination of a call or call request, the authentication system 202 can delete or remove the token and/or any other information associated with the terminated call from the call session registry 220. In some implementations, the authentication system 202 can remove the token from an active call list, and place it in a call history log. In some implementations, the authentication system 202 can use the call history log to determine an interaction history of one or more entities (e.g., number or frequency of calls between entities, number of total calls placed by an entity, frequency of calls placed by an entity, etc.) As explained, the interaction history can be used in verifying a call request received by a called party.

As explained, when the calling party device 204 places a call request to the called party device 206, the call request traverses the call path through the calling party network 208 and the carrier network(s) 210. The called party device 206 can receive the call request, and can initiate a verification process for the call request to ensure that the call request is a legitimate, trusted request. The called party device 206 can include one or more authentication applications 226. In some implementations, the authentication application(s) 226 can include applications developed in association with the authentication system 202. In some implementations, the authentication application(s) 226 can include applications developed by third-party entities (e.g., businesses, enterprises, organizations) of which the called party is a customer, client, etc. that are registered with the authentication system 202. For instance, application(s) 226 can include applications associated with entities, that are configured to communicate with the authentication system 202 (e.g. via an SDK, API, etc. associated with the authentication system 202). Similarly, the application(s) 226 can include a stand-alone application associated with the authentication system 202. In this manner, the called party device 206 can include multiple applications 226 that are configured to communicate with the authentication system 202.

Upon receiving the call request, the called party device 206 can determine the appropriate application 226 to use to communicate with the authentication system 202. For instance, the called party device 206 can determine which authentication application 226 the calling party telephone number is associated with. As explained above, the authentication system 202 can periodically provide telephone numbers associated with registered entities to the telephone devices of the customers of those entities. Thus, upon receiving a call request, the called party device 206 can check the calling party telephone number against the stored list of telephone numbers provided by the authentication system 202 to determine the appropriate entity and/or application 226. This can be performed at the operating system level or by the respective authentication application(s) 226. Upon determining the appropriate authentication application 226, that application 226 can be selected to communicate with the authentication system 202 to attempt to verify the call request.

In this manner, the selected authentication application 226 can provide a verification request to the authentication system 202. The verification request can include, for instance, information associated with the call request, such as a called party number, calling party number, timestamp etc., and/or information associated with the called party device, such as a device identifier, application identifier, user profile information, etc.

Upon receiving the verification request at the authentication system 202, the verifier 216 can perform a verification process on the request. For instance, the verifier 216 can access the call session registry 220 to determine whether it is currently storing a token corresponding to the call request to be verified. The verifier 216 can identify the corresponding token, for instance, by comparing the information included in the verification request to the information included in the tokens stored in the call session registry. If the verification request corresponds to a token, the verifier 216 verifies the call request. If the verification request does not correspond to a token, the verifier 216 will not verify the call request. In such cases, the verifier 216 may flag the non-verified call request as a spoofed call, robocall, etc.

The verifier 216 can further verify that the calling party is registered with the authentication system and/or that the calling party is a trusted caller. For instance, the verifier 216 can access the subscriber database to determine whether the call request was placed by a subscriber or registered user (based on the information in the verification request). The verifier 216 can further access the subscriber database to determine the reputation of the calling party (i.e., whether the calling party is a trusted party).

The authentication system 202 can notify the called party device 206 of the verification result and/or the reputation of the calling party. For instance, the authentication system 202 can provide the verification result (e.g. verified or not verified) to the authentication system application 224 of the called party device 206. In some implementations, the authentication system 202 can further provide content, such as images, multimedia content, or rich content, to the called party device. For instance, such content can be indicative of the verification result. As another example, such content can be associated with and specified by the calling party device and/or the calling party enterprise or organization. In some implementations, the authentication system 202 provides the content to the called party device only if the authentication system 202 verifies the call request.

The content provider 218 can identify the appropriate content to provide to the called party device 206. As indicated above, the calling party (e.g., an enterprise or organization) can specify content to be provided to called parties. For instance, the content may be an image with the enterprise logo and/or other information associated with the enterprise. The calling party can provide such content to the authentication system 202, where it can be stored. Thus, upon verifying a call request from the calling party, the content provider can access the content and provide it to the called party device.

In some implementations, the calling party may specify different content to be provided to different called party devices. That is, the calling party may specify that first content be provided to a first called party device and that second content be provided to a second called party device. The content may be selected, for instance, based on a relationship or interaction history between the calling party and the called party. For instance, the calling party may provide different content to a customer or client than it would to a non-customer. In such implementations, the calling party can specify the different content policies to the authentication system 202. The content provider 218 can then determine the appropriate content to provide to the calling party based on the relationship between the calling and called parties. For instance, the content provider 218 can access the subscriber database 222 to determine that the called party is a customer of the calling party, and then to select the appropriate content to provide to the called party.

The content provider 218 can further select the appropriate content based at least in part on the called party device capabilities and/or specifications (e.g., processing capabilities, screen size, screen resolution, graphics capabilities, etc.). As explained, the subscriber database 222 can store data indicative of the capabilities and/or specifications of registered devices. Upon the verification of a call request, the content provider 218 can identify this information, and can select or generate content to accommodate the capabilities and/or specifications of the called party device. In some implementations, the content provider 218 can modify existing content to accommodate the called party device. As an example, the content provider 218 can select, generate or modify an image of a particular size based on the screen size of the called party device. As another example, if the called party device is only capable of displaying text, the content provider 218 will not provide images to the called party device.

Figure 3:
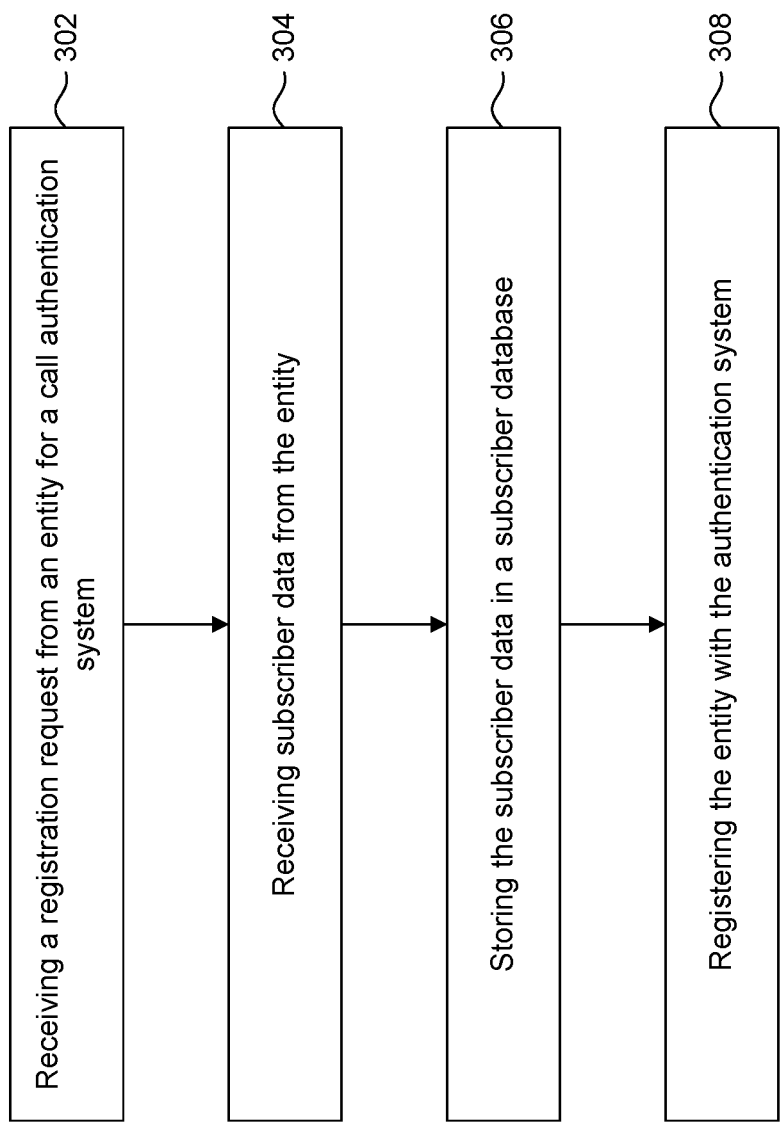
FIG. 3 depicts a flow diagram of an example method of registering users according to example embodiments of the present disclosure.

FIG. 3 depicts a flow diagram of an example method 300 of registering an entity with a mobile call authentication system according to example aspects of the present disclosure. For instance, at (302), the method (300) can include receiving a registration request from an entity for a call authentication system. The entity can be an enterprise, business, organization, individual user, or other suitable entity. The entity can have one or more associated telephone devices for placing and receiving telephone calls. For instance, the call authentication system can correspond to the authentication systems 102 and/or 202 depicted in FIGS. 1 and 2.

At (304), the method (300) can include receiving subscriber data from the entity. The subscriber data can be provided, for instance, by an application implemented on a telephone device or other computing device associated with the entity and/or the entity's network. The subscriber data can include identifying information, device information, policy information, subscription information, and/or other information. For instance, the identifying information can include an identifier of the entity, unique identifiers for the telephone device(s) of the entity, telephone numbers of the entity telephone devices, user profiles for the entity members, data specifying the type of software applications used by the telephone device(s) to access the authentication system, and/or other information. The device information can include make and model, processing capabilities, graphics capabilities, memory resources, display size and resolution, etc. of the entity's telephone device(s). The subscription and/or policy data can include services and/or other entities that the user subscribes to, actions to be taken upon placement of a call request, and/or actions to be taken upon receipt of different types of telephone call requests (e.g., verified requests, spoofed calls, robocalls, etc.). In some implementations the subscription and/or policy data can specify content to be provided to called parties.

In some implementations, the authentication system can periodically receive subscriber data, for instance, based on changes in the entity or to the entity's subscription or policy specifications, telephone device(s), etc. Upon receiving updated subscriber data, the authentication system can replace or modify the existing subscriber data to reflect the new data.

At (306), the method (300) can include storing the subscriber data in a subscriber database. As explained, the authentication system can later access this subscriber data to authenticate and/or verify call requests placed by the entity and/or received by the entity. The authentication system can further access this subscriber data to determine actions to be taken upon call requests placed or received by the entity.

At (308), the method (300) can include registering the entity with the authentication system. The authentication system is thus enabled to authenticate and verify call requests placed or received by the entity. In some implementations, the authentication system can further provide at least a portion of the subscriber data associated with registered entities to other telephone devices registered with the authentication system. For instance, the authentication system can provide data associated with an entity, such as telephone numbers associated with the entity, to telephone devices that are customers, clients, etc. of the entity and/or that have an application associated with the entity installed on their telephone devices.

Figure 4:
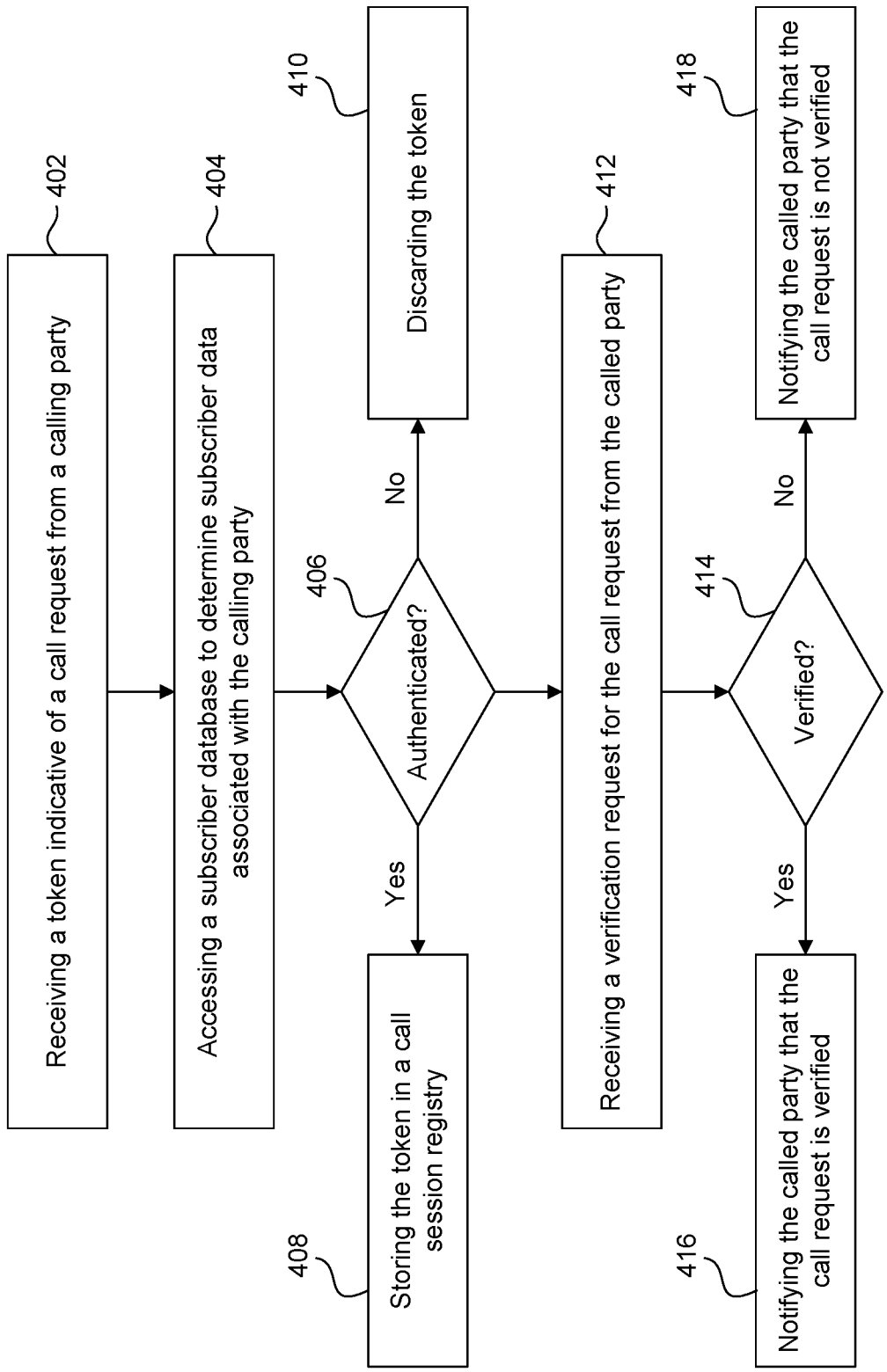
FIG. 4 depicts a flow diagram of authenticating calls according to example embodiments of the present disclosure.

FIG. 4 depicts a flow diagram of an example method (400) for authenticating and verifying a call request from a calling party to a called party according to example aspects of the present disclosure. The steps of the method (400) can be performed, for instance, by the authentication systems 102 and/or 202 depicted in FIGS. 1 and 2.

At (402), the method (400) can include receiving a token indicative of a call request from a calling party. The token can be received, for instance, via a network that is not implemented in the call path on which the call request travels. The token can include, for instance, a calling party number, a called party number, a timestamp of the request, a unique identifier for the calling party device, a unique identifier of the called party device, an identification of the application used by the calling party device to send the token, and/or other suitable information. The token can be generated by an application implemented on the calling party device or other computing device associated with the calling party (e.g., entity). In some implementations, the calling party can send the information to be implemented in the token and the authentication system can actually generate the token.

At (404), the method (400) can include accessing a subscriber database to determine subscriber data associated with the calling party. As explained, prior to placing the call request, the calling party can provide subscriber data to the authentication system that is stored in the subscriber database so that the authentication system can register the calling party. The subscriber database can further store other data associated with the calling party. For instance, the subscriber database can store reputation data associated with the calling party, indicating a trustworthiness of the calling party.

At (406), the method (400) can include determining whether to authenticate the token. The authentication process can be performed using one or more known authentication protocols, such as S/S or federated identity. For instance, to authenticate the call request, the authentication system can determine whether the calling party device and/or the called party device is registered with the authentication system. The authentication system can further determine whether the calling party is a trusted entity (e.g., based on the entity's reputation score). If the authentication system authenticates the token, at (408), the method (400) includes storing the token in a call session registry. As explained, the call session registry can log active telephone calls and call requests for the duration of the call or request. In this manner, once the call or request ends, the authentication system can discard the token from the call session registry. Referring back to (406), if the authentication system does not authenticate the token, at (410), the method can include discarding the token.

At (412), the method can include receiving a verification request for the call request from the called party. That is, once the called party receives the call request via the call path, the called party can provide a verification request to the authentication system via a network, such as the internet. The verification request can include, for instance, information associated with the call request, such as a called party number, calling party number, timestamp etc., and/or information associated with the called party device, such as a device identifier, application identifier, user profile information, etc.

In some implementations, the verification request can be generated by an application installed on the called party device. For instance, upon receiving the call request, the called party device can determine an appropriate application to handle the call request. The application can be configured to communicate with the authentication system. The application can be an application provided by authentication system or it can be an application associated with the calling entity. In this regard, the called party device may include multiple applications configured to communicate with the authentication system, and associated with multiple entities who are registered with the authentication system. The called party device can determine the appropriate application for communication with the authentication device based on the telephone number of the calling party device. For instance, the called party device can store telephone numbers associated with various entities, and can access this list to determine the entity associated with the called party device. In some instances, the called party device can then select the application associated with the calling entity to communicate with the authentication system to verify the call request. The selected application can then generate and provide the verification request to the authentication system.

At (414), the method (400) can include determining whether to verify the call request. For instance, the authentication system can access the call session registry to determine if it stores a token corresponding to the call request based at least in part on the information included in the verification request. If the verification request corresponds to a token, the call request may be verified. If the verification request does not correspond to a token, the call request will not be verified. In such cases, the non-verified call request may be flagged as a spoofed call, robocall, etc. In some implementations, the verification process can further include determining whether the calling party is a registered user and/or that the calling party is a trusted caller. For instance, in such cases, the call request may not be verified unless the calling party is a trusted user (e.g. based on its reputation score).

If the call request is verified at (414), the method (400) can include, at (416), notifying the called party that the call request is verified. If the call request is not verified, at (418), the method can include notifying the called party that the call request is not verified.

Figure 5:
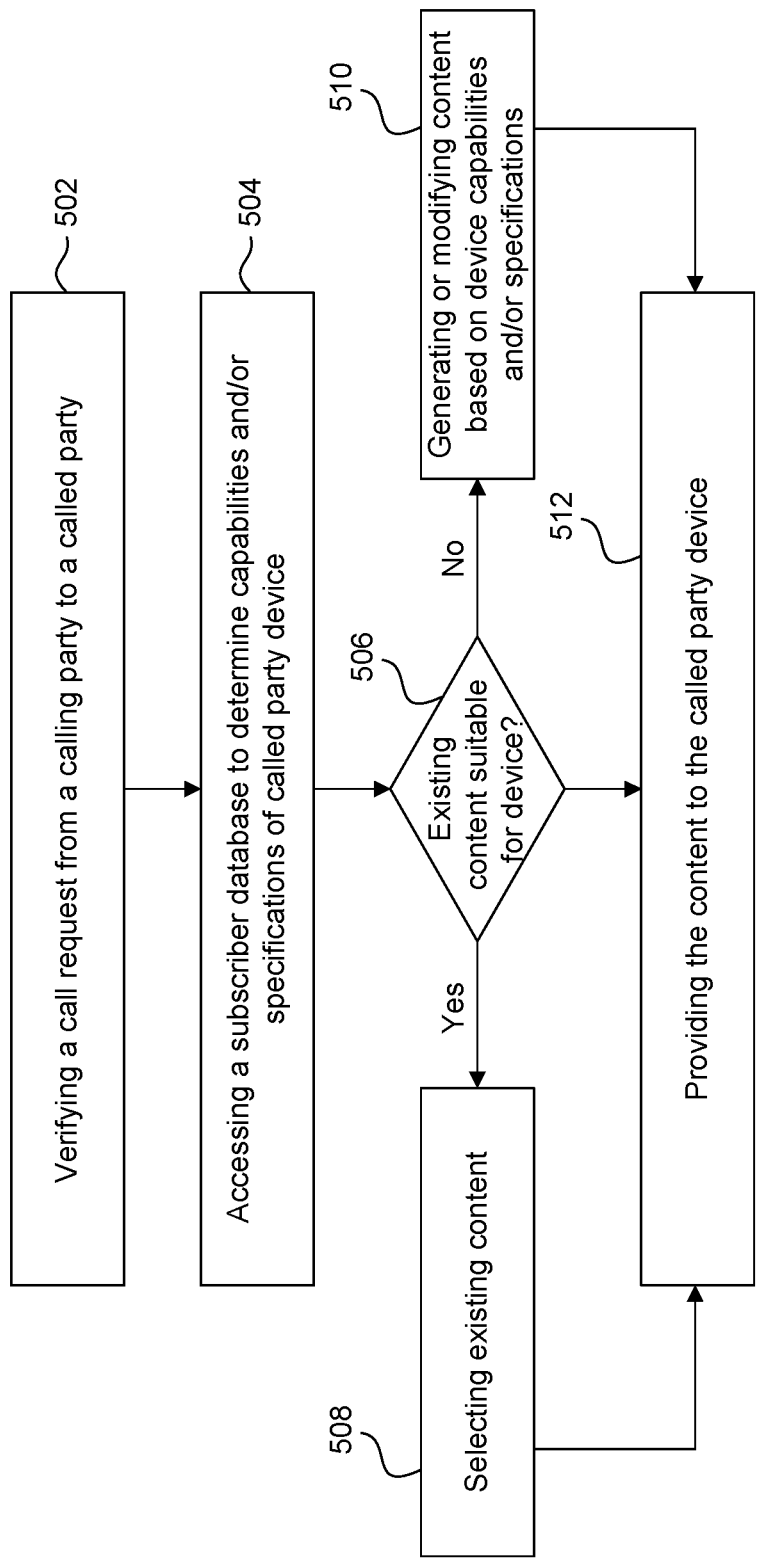
FIG. 5 depicts a flow diagram of an example method of providing content according to example embodiments of the present disclosure.

Upon verification of a call request, the authentication system can provide further content to the called party. FIG. 5 depicts a flow diagram of an example method (500) for providing content to a called party according to example aspects of the present disclosure. The steps of method (500) can be performed, for instance, by the authentication systems 102 and/or 202 of FIGS. 1 and 2.

At (502), the method (500) can include verifying a call request from a calling party to a called party. For instance, the call request can be verified in the manner described above with respect to the method (400).

At (504), the method (500) can include accessing a subscriber database to determine capabilities and/or specifications of the called party device. As indicated, upon registration (or periodically after registration), registered users can provide data indicative of their devices to the authentication system. This data can include a make and model, processing capabilities, graphics capabilities, memory resources, display size and resolution, etc. of the device.

At (506), the method (500) can include determining whether the subscriber database includes existing content that is suitable for the called party device based at least in part on the capabilities and/or specifications of the called party device. For instance, the calling party may specify content to be provided to called parties, such as an image, text, rich content, etc. As explained, in some implementations, the calling party may specify different content for different called parties, for instance, based at least in part on a relationship between the calling and called parties (e.g. customer vs. non-customer). In some implementations, the calling party can provide images of various sizes, resolutions, designs, etc. to accommodate various called party device screen sizes. In this manner, the calling party may provide a content policy for provision of content specifying which content is to be provided to which called parties (or category of called parties). This content and/or content policy may be stored in the subscriber database. Thus, upon verifying a call request from a calling party to a called party, the authentication system can determine whether the subscriber database includes existing content that can be accommodated by the called party device.

For instance, the authentication system can determine the content to be provided to the called party based on the content policy. That is, the authentication system can access the subscriber database to determine the type of content to be provided to the called party device as specified in the content policy. The authentication system can further determine whether the subscriber database includes content that can be accommodated by the called party device based at least in part on the device capabilities and/or specifications.

If the subscriber database includes suitable content, at (508), the method (500) can include selecting the existing suitable content. If the subscriber database does not include existing suitable content, at (510), the method (500) can include generating new content or modifying existing content based at least in part on the called party device capabilities and/or specifications. For instance, the authentication system can generate a new image or new text that can be suitably displayed by the called party device. As another example, the authentication system can resize an existing image so that is may be suitably displayed by the called party device.

At (512), the method (500) can include providing the content to the called party device. This can include providing the selected existing content (508), or the generated or modified content (510) to the called party device. The called party device can then output (e.g., display) the content. For instance, in some implementations, the content can be provided to and output by the authentication application installed on the called party device that provided the verification request.

Figure 6:
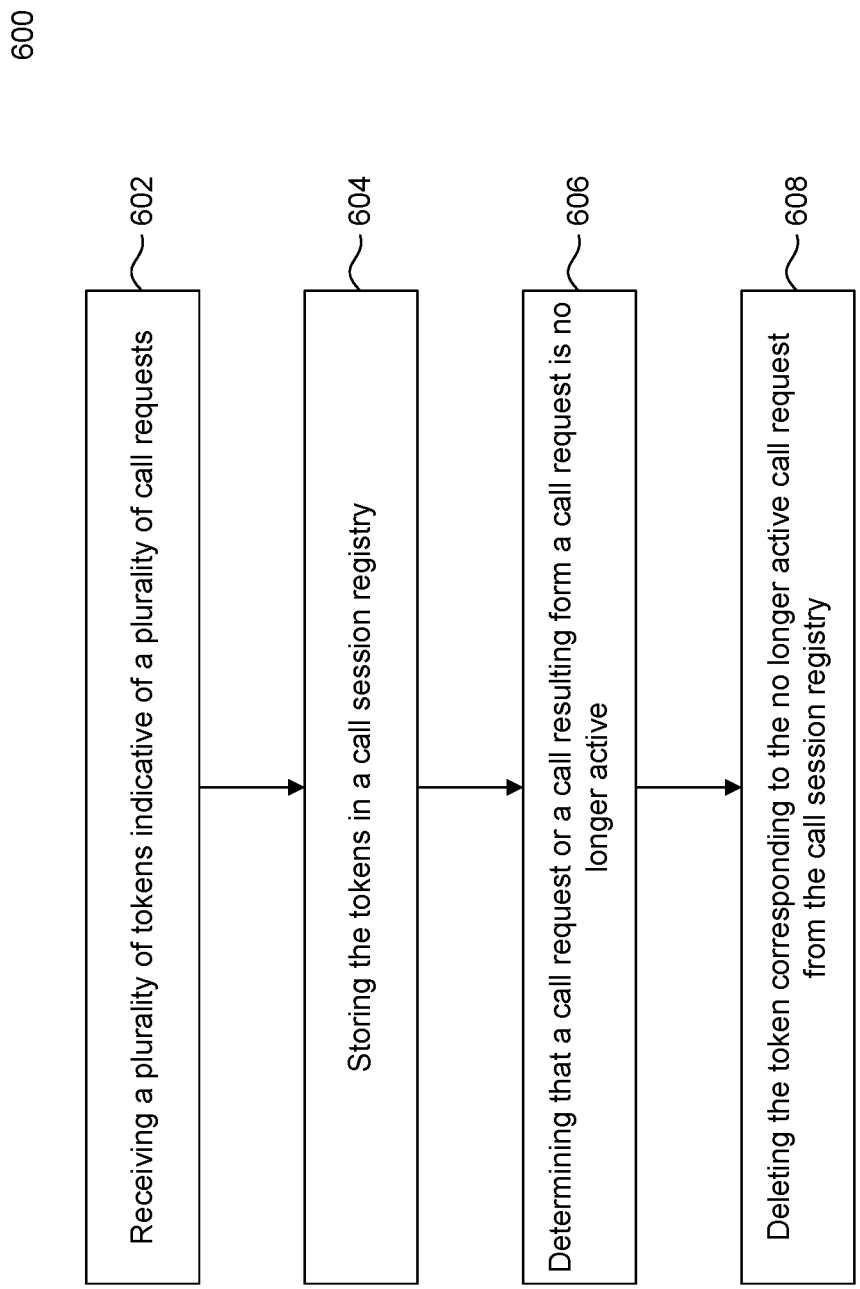
FIG. 6 depicts a flow diagram of an example method of storing active call events according to example embodiments of the present disclosure.

FIG. 6 depicts a flow diagram of an example method (600) of recording active call requests or calls in a call session registry according to example aspects of the present disclosure. For instance, the steps of the method (600) can be performed by the call authentication systems 102 and/or 202 of FIGS. 1 and 2.

At (602), the method (600) can include receiving a plurality of tokens, each indicative of a call request from a calling party to a called party. For instance, the tokens can be received by an authentication system outside of the call path from the calling party to the called party on which the call request traverses. In some implementations, the tokens can be provided to the authentication system via a network such as the internet.

At (604), the method (600) can include storing the tokens in a call session registry. As explained, the call session registry can log active telephone calls or call requests (that have yet to be answered by the called party). In this manner, the authentication system can store each received token in the call session registry for the duration of the call request or resulting answered call corresponding to the token.

At (606), the method (600) can include determining that a call event (e.g., the call request or an initiated call resulting from the call request) has ended. For instance, this can occur when the called party neglects to answer the initial call request. If the user answers the call request, this can occur when the initiated call is ended, such as when a party hangs up the call. In such instances, the call request or resulting call is no longer active.

At (608), the method (600) can include deleting the token corresponding to the no longer active call request or call. That is, once the call request or call is no longer active, the authentication system can delete the record of the call by deleting the token from the call session registry. The authentication system can do this for each ended call request or call. In this manner, the call session registry only maintains tokens corresponding to active call requests or calls. As explained above, this allows the authentication system to verify call requests by determining whether the call session registry is currently storing a token associated with the call request.

Figure 7:
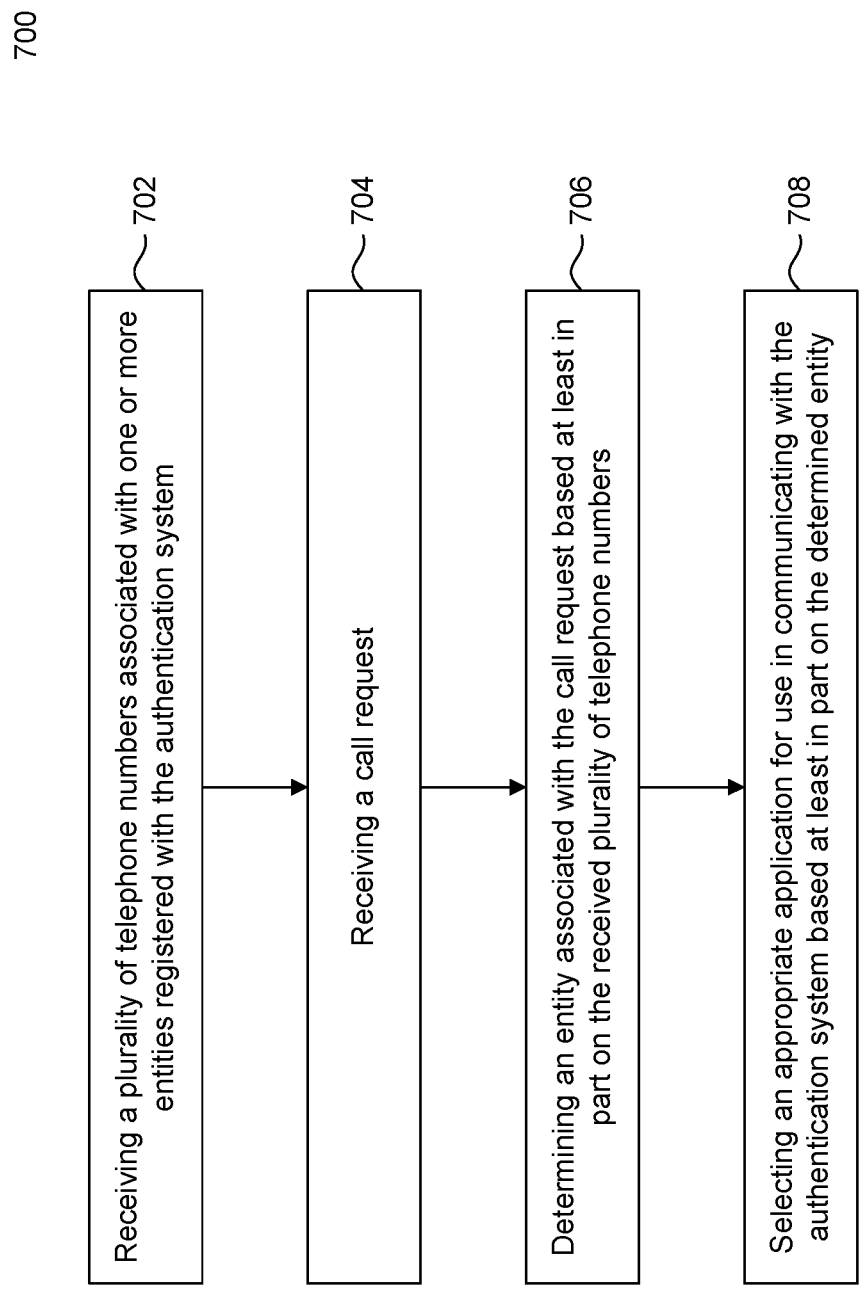
FIG. 7 depicts a flow diagram of an example method of determining applications for communication with an authentication system according to example embodiments of the present disclosure.

FIG. 7 depicts a flow diagram of an example method (700) of determining an appropriate application for communication with an authentication system according to example embodiments of the present disclosure. For instance, the steps of the method (600) can be performed by the call authentication systems 102 and/or 202 of FIGS. 1 and 2.

At (702), the method (700) can include receiving a plurality of telephone numbers associated with one or more entities registered with an authentication system. The telephone numbers can include telephone numbers of telephone devices of the entities that place outgoing calls. For instance, entities that register with the authentication system can periodically provide its telephone numbers to the authentication system. The authentication system can in turn provide the telephone numbers to authentication system users that have an association with the respective entities (e.g., customer, client, etc.).

At (704), the method (700) can include receiving a call request. At (706), the method (700) can include determining the entity associated with the call request based at least in part on the received plurality of telephone numbers. For instance, the called party device can determine the entity that corresponds to the telephone number of the call request by checking the telephone number against the list of stored telephone numbers. This can be performed, for instance, at the operating system level or by one or more authentication applications configured to communicate with the authentication system. The called party device can include one or more applications associated with the authentication system that can be used, among other things, to verify call requests with the authentication system. The applications can include a stand-alone application of the authentication system, and/or third-party applications associated with respective entities registered with the authentication system. In some implementations, one or more of these applications may access (at least a portion of) the stored telephone numbers to determine the entity that placed the call request. For instance, an application associated with an entity may access the list of telephone numbers associated with the entity to determine whether the entity placed the call request.

At (706), the method (700) can include selecting an appropriate application(s) to communicate with the authentication system based at least in part on the determined entity. For instance, the appropriate application can be the stand-alone authentication system application and/or an application provided by the determined entity that is configured to communicate with the authentication system. In this manner, applications associated with registered entities do not communicate with the authentication system to verify call requests that did not originate from their respective entities.

Figure 8:
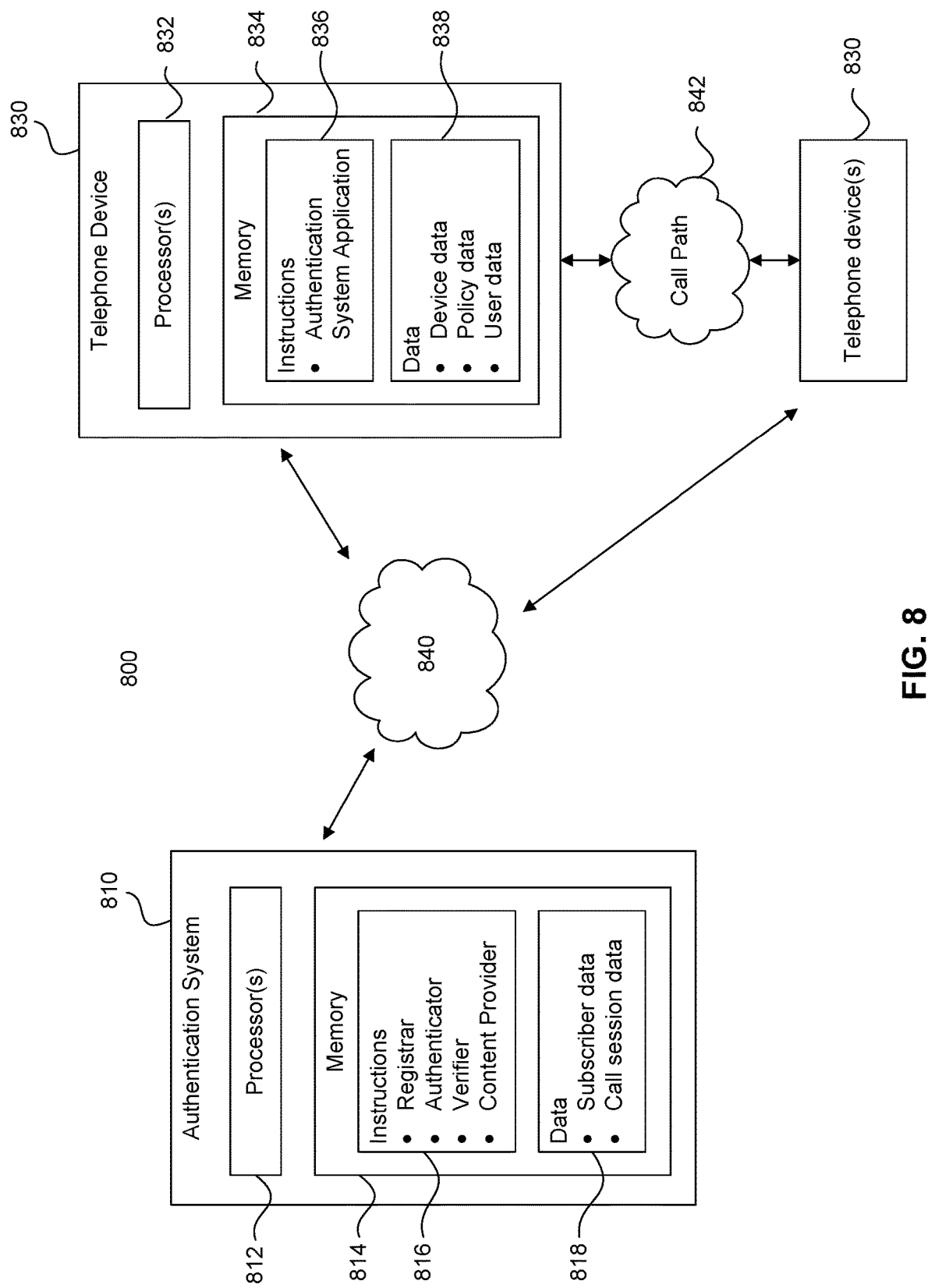
FIG. 8 depicts an example computing system according to example embodiments of the present disclosure.

FIG. 8 depicts an example system 800 that can be used to implement the methods and systems of the present disclosure. The system 800 can be implemented using a client-server architecture that includes an authentication system 810 that communicates with one or more remote computing devices, such as telephone devices 830. The system 800 can be implemented using other suitable architectures.

As shown, the system 800 can include an authentication system 810. The authentication system 810 can include one or more computing devices, and can be implemented, for instance, as a parallel or distributed computing system. In particular, multiple computing devices can act together as a single authentication system 810. The authentication system 810 can include one or more processor(s) 812 and one or more memory devices 814. The one or more processor(s) 812 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 814 can include one or more computer-readable media, including, but not limited to, non-transitory computer-readable media, RAM, ROM, hard drives, flash memory, or other memory devices.

The one or more memory devices 814 can store information accessible by the one or more processors 812, including instructions 816 that can be executed by the one or more processors 812. For instance, the memory devices 814 can store the instructions 816 for implementing one or more modules configured to implement the registrar 212, authenticator 214, verifier 216, content provider 218, and/or other suitable modules.

Each module can include computer logic utilized to provide desired functionality. Thus, each module can be implemented in hardware, application specific circuits, firmware and/or software controlling a general purpose processor. In one embodiment, each module are program code files stored on the storage device, loaded into memory and executed by a processor, or can be provided from computer program products, for example computer executable instructions, that are stored in a tangible computer-readable storage medium such as RAM, hard disk or optical or magnetic media. Each module can correspond to one or more different programs, files, circuits, or sets of instructions. Likewise, two or more of the modules can be combined into a single program, file, circuit, or set of instructions.

The instructions 816 can further include instructions for implementing a browser for other software application, or for performing other functions on the authentication system 810. For instance, the instructions can be used to exchange data with telephone device 830 over the network 840. The instructions 816 can include client-device-readable code for providing and implementing aspects of the present disclosure.

The one or more memory devices 814 can also include data 818 that can be retrieved, manipulated, created, or stored by the one or more processors 812. The data 818 can include, for instance, subscriber data, call session data, and/or other data. As explained, the subscriber data can include identifying data, device data, subscription or policy data, reputation data, interaction data, and/or other suitable data for each registered user (enterprise, organization, individual user, etc.). The call session data can include data indicative of active call requests or calls known by the authentication system 810. The data can be stored in one or more databases, such as a subscriber database and/or a call session registry. In some implementations, the one or more databases can be connected to the authentication system 810 by a high bandwidth LAN or WAN, or can also be connected to authentication system 810 through network 840 or other network. The one or more databases can be split up so that they are located in multiple locales.

The authentication system 810 can also include a network interface used to communicate with one or more remote computing devices (e.g. telephone devices 830) over a network 840. The network interface can include any suitable components for interfacing with one more networks, including for example, transmitters, receivers, ports, controllers, antennas, or other suitable components.

In some implementations, the authentication system 810 can be in communication with telephone devices 830 over network 840. The telephone device 830 can be any suitable type of user computing device configured to place and receive telephone calls, such as a smartphone, tablet, cellular telephone, wearable computing device, wired telephone, or any other suitable user computing device capable of being used for communicating telephone calls.

Similar to the authentication system 810, the telephone device 830 can include one or more processor(s) 832 and a memory 834. The one or more processor(s) 832 can include one or more central processing units (CPUs), and/or other processing devices. The memory 834 can include one or more computer-readable media and can store information accessible by the one or more processors 832, including instructions 836 that can be executed by the one or more processors 832, and data 838. The data 838 can include device data, policy data, user data, and other data. The telephone device 830 can store further instructions for implementing further functionality according to example aspects of the present disclosure. For instance, although the registrar 212, authenticator 214, verifier 216, and content provider 218 are depicted in FIG. 8 as being included in the authentication system 810, in other implementations, at least portions of one or more of these modules can be included in the telephone device 830. In such implementations, at least some of the functionality performed by these modules can be performed by the telephone device 830.

The telephone device 830 can include various input/output devices for providing and receiving information from a user, such as a touch screen, touch pad, data entry keys, speakers, and/or a microphone suitable for voice recognition. For instance, the telephone device 830 can have a display 820 for presenting a user interface to a user.

The telephone device 830 can further include a positioning system. The positioning system can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system (e.g. using positioning sensors, such as an inertial measurement unit), a dead reckoning system, based on IP address, by using triangulation and/or proximity to cellular towers, Bluetooth hotspots, BLE beacons, Wi-Fi access points or Wi-Fi hotspots, Wi-Fi time-of-flight, and/or other suitable techniques for determining position.

Telephone device 830 can also include one or more network interfaces used to communicate with authentication 810 over network 840 and one or more other telephone devices 830 over call path 842. The network interface(s) can include any suitable components for interfacing with one more networks, including for example, transmitters, receivers, ports, controllers, antennas, or other suitable components. As explained, the call path 842 can include one or more networks, such as one or more carrier networks and/or internal party networks, and/or one or more switches, routers, etc.

Network 840 can be any type of communications network, such as a local area network (e.g. intranet), wide area network (e.g. Internet), cellular network, or some combination thereof. Network 840 can also include a direct connection between the authentication system 810 and telephone device 830. Network 840 can include any number of wired or wireless links and can be carried out using any suitable communication protocol.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for providing end-to-end mobile call authentication, the method comprising:
   receiving, by one or more computing devices, a token indicative of a call request from a calling party, the token comprising a called party telephone number and a time of the call request, wherein the called party telephone number is associated with a called party and a called party device;
   accessing, by the one or more computing devices, a subscriber database to determine the identifying information associated with the calling party based at least in part on the token;
   authenticating, by the one or more computing devices, the token based at least in part on the identifying information and using one or more predefined authentication protocols;
   storing, by the one or more computing devices, the authenticated token in a call session registry, wherein the call session registry stores tokens indicative of a plurality of active telephone call events until the telephone call events are terminated;
   receiving, by the one or more computing devices, a verification request for the call request from the called party;
   in response to receiving the verification request, verifying, by the one or more computing devices, the call request by determining that the authenticated token is currently stored in the call session registry; and
   in response to the verifying, notifying, by the one or more computing devices, the called party that the call request has been verified.

2. The computer-implemented method of claim 1, further comprising, prior to receiving the token indicative of the call request:
   receiving, by the one or more computing devices, first subscriber data specifying one or more attributes of the calling party, and second subscriber data specifying one or more attributes of the called party; and
   registering, by the one or more computing devices, the calling party based at least in part on the first subscriber data, and the called party based at least in part on the second subscriber data;
   wherein the first subscriber data and the second subscriber data comprise the identifying information, device information, and subscription or policy information respectively associated with the calling party and the called party; and
   wherein accessing the subscriber database comprises accessing at least one of the first subscriber data and the second subscriber data.

3. The computer-implemented method of claim 1, further comprising:
   accessing, by the one or more computing devices, the subscriber database to determine device capabilities and specifications of the called party device;
   identifying in the subscriber database, by the one or more computing devices, content associated with the calling party to be provided to the called party device; and
   determining, by the one or more computing devices, whether the content can be accommodated by the called party device based at least in part on the capabilities and specifications of the called party device.

4. The computer-implemented method of claim 3, further comprising, when the content can be accommodated by the called party device, providing, by the one or more computing devices, the content to the called party device.

5. The computer-implemented method of claim 3, further comprising, when the content cannot be accommodated by the called party device:
   modifying, by the one or more computing devices, the content or
   generating new content based at least in part on the capabilities and specifications of the called party device.

6. The computer-implemented method of claim 1, further comprising:
   determining, by the one or more computing devices, when the call request or a telephone call resulting from the call request is no longer active; and
   deleting, by the one or more computing devices, the token from the call session registry when the call request or the telephone call is no longer active.

7. The computer-implemented method of claim 1, wherein the token further comprises at least one of a calling party telephone number, a direction of the call request, information associated with a telephone carrier, or information associated with a telephone network.

8. The computer-implemented method of claim 1, wherein the identifying information associated with the called party comprises at least one of a user profile associated with a mobile application installed on a mobile phone of the called party, a unique identifier of the called party, or information specifying one or more services to which the called party subscribes.

9. The computer-implemented method of claim 1, wherein the one or more predefined authentication protocols comprise a stir/shaken (S/S) protocol.

10. The computer-implemented method of claim 1, wherein the calling party is an enterprise and the called party is a mobile telephone.

11. A call authentication system comprising:
    a call session registry configured to store data indicative of a plurality of active telephone call events;
    a subscriber database configured to store identifying information associated with a plurality of users; and one or more processors coupled to the call session registry and the subscriber database, the one or more processors configured to:
    receive a token indicative of a call request from a calling party, the token comprising a called party telephone number and a time of the call request, wherein the called party telephone number is associated with a called party and a called party device;
    access the subscriber database to determine the identifying information associated with the called party based at least in part on the token;
    authenticate the token based at least in part on the identifying information and using one or more predefined authentication protocols;
    store the authenticated token in the call session registry, wherein the call session registry stores tokens indicative of a plurality of active telephone call events until the telephone call events are terminated;
    receive a verification request for the call request from the called party;
    in response to receiving the verification request, verify the call request by determining that the authenticated token is currently stored in the call session registry; and
    in response to the verifying, notify the called party that the call request has been verified.

12. The call authentication system of claim 11, the one or more processors further configured to, prior to receiving the token indicative of the call request:
    receive first subscriber data specifying one or more attributes of the calling party, and second subscriber data specifying one or more attributes of the called party; and
    register the calling party based at least in part on the first subscriber data, and the called party based at least in part on the second subscriber data;
    wherein the first subscriber data and the second subscriber data comprise the identifying information, device information, and subscription or policy information respectively associated with the calling party and the called party; and
    wherein accessing the subscriber database comprises accessing the first subscriber data and the second subscriber data.

13. The call authentication system of claim 11, wherein the one or more processors are further configured to:
    access the subscriber database to determine device capabilities and specifications of the called party device;
    identify, in the subscriber database, content associated with the calling party to be provided to the called party device; and
    determine whether the content can be accommodated by the called party device based at least in part on the capabilities and specifications of the called party device.

14. The call authentication system of claim 13, wherein the one or more processors are further configured to, when the content can be accommodated by the called party device, provide the content to the called party device.

15. The call authentication system of claim 13, wherein the one or more processors are further configured to, when the content cannot be accommodated by the called party device:
    modify the content or
    generating new content based at least in part on the capabilities and specifications of the called party device.

16. A non-transitory computer-readable media having instructions stored thereon that, when executed by one or more computing devices, causes the one or more computing devices to perform operations comprising:
    receiving a token indicative of a call request from a calling party, the token comprising a called party telephone number and a time of the call request, wherein the called party telephone number is associated with a called party and a called party device;
    accessing, by the one or more computing devices, a subscriber database to determine identifying information associated with the called party based at least in part on the token;
    authenticating the token based at least in part on the identifying information and using one or more predefined authentication protocols;
    storing the authenticated token in a call session registry, wherein the call session registry stores tokens indicative of a plurality of active telephone call events until the telephone call events are terminated;
    receiving a verification request for the call request from the called party;
    in response to receiving the verification request, verifying the call request by determining that the authenticated token is currently stored in the call session registry; and
    in response to the verifying, notifying the called party that the call request has been verified.

17. The non-transitory computer-readable media of claim 16, the operations further comprising, prior to receiving the token indicative of the call request:
    receiving first subscriber data specifying one or more attributes of the calling party, and second subscriber data specifying one or more attributes of the called party; and
    registering the calling party based at least in part on the first subscriber data, and the called party based at least in part on the second subscriber data;
    wherein the first subscriber data and the second subscriber data comprise the identifying information, device information, and subscription or policy information respectively associated with the calling party and the called party; and
    wherein accessing the subscriber database comprises accessing the first subscriber data and the second subscriber data.

18. The non-transitory computer-readable media of claim 16, the operations further comprising:
    accessing the subscriber database to determine device capabilities and specifications of the called party device;
    identifying, in the subscriber database, content associated with the calling party to be provided to the called party device; and
    determining whether the content can be accommodated by the called party device based at least in part on the capabilities and specifications of the called party device.

19. The non-transitory computer-readable media of claim 16, the operations further comprising:
    determining when the call request or a telephone call resulting from the call request is no longer active; and
    deleting the token from the call session registry when the call request or the telephone call is no longer active.

\* \* \* \* \*